United States Patent
Mohsenizadeh et al.

(10) Patent No.: US 12,128,619 B2
(45) Date of Patent: Oct. 29, 2024

(54) WINDOW THERMAL PROFILE CALIBRATION IN ADDITIVE MANUFACTURING

(71) Applicant: Carbon, Inc., Redwood City, CA (US)

(72) Inventors: Daniel N. Mohsenizadeh, Foster City, CA (US); Kyle Laaker, Redwood City, CA (US); Ronald A. Truong, Belmont, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/967,969

(22) Filed: Oct. 18, 2022

(65) Prior Publication Data
US 2023/0038421 A1    Feb. 9, 2023

Related U.S. Application Data

(62) Division of application No. 17/298,149, filed as application No. PCT/US2019/062762 on Nov. 22, 2019, now Pat. No. 11,498,274.
(Continued)

(51) Int. Cl.
*B29C 64/245* (2017.01)
*B29C 64/124* (2017.01)
(Continued)

(52) U.S. Cl.
CPC .......... *B29C 64/245* (2017.08); *B29C 64/124* (2017.08); *B29C 64/295* (2017.08);
(Continued)

(58) Field of Classification Search
CPC ... B29C 64/124; B29C 64/129; B29C 64/135; B29C 64/259; B29C 64/255; B29C 64/245; B33Y 10/00; B33Y 30/00; B33Y 50/02
See application file for complete search history.

(56) References Cited

U.S. PATENT DOCUMENTS

| 2,933,711 A | 4/1960 | Eaton |
| 3,363,214 A | 1/1968 | Wright |

(Continued)

FOREIGN PATENT DOCUMENTS

| CN | 205439264 U | 8/2016 |
| CN | 106346775 A | 1/2017 |

(Continued)

OTHER PUBLICATIONS

International Preliminary Report on Patentability corresponding to PCT/US2019/038211, Dec. 29, 2020, (7 pages).
(Continued)

*Primary Examiner* — Jamel M Nelson
(74) *Attorney, Agent, or Firm* — Myers Bigel, P.A.

(57) ABSTRACT

Methods, systems, and/or apparatuses for making an object on a bottom-up stereolithography apparatus that includes a light source, a drive assembly, optionally a heater and/or cooler, and a controller. The light source, optional heater and/or cooler, and/or the drive assembly have at least one adjustable parameter that is adjustable by said controller. An example method comprises (a) installing a removable window cassette on said apparatus in a configuration through which said light source projects, said window cassette comprising an optically transparent member having a build surface on which an object can be produced, and with said optically transparent member having at least one thermal profile associated therewith; and then (b) modifying said at least one adjustable parameter by said controller based on said at least one thermal profile of said optically transparent member; and then (c) producing the object on said build surface from a light-polymerizable liquid by bottom-up stereolithography.

16 Claims, 4 Drawing Sheets

Related U.S. Application Data (60) Provisional application No. 62/774,384, filed on Dec. 3, 2018.

(51) Int. Cl.
| | | |
|---|---|---|
| *B29C 64/295* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,236,637 A | 8/1993 | Hull |
| 5,391,072 A | 2/1995 | Lawton et al. |
| 5,529,473 A | 6/1996 | Lawton et al. |
| 7,438,846 B2 | 10/2008 | John |
| 7,517,222 B2 | 4/2009 | Rohrbach et al. |
| 7,874,844 B1 | 1/2011 | Fitts |
| 7,892,474 B2 | 2/2011 | Shkolnik et al. |
| 8,110,135 B2 | 2/2012 | El-Siblani |
| 8,120,468 B2 | 2/2012 | Kangas |
| 8,526,910 B2 | 9/2013 | Messerly |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,220,362 B2 | 12/2015 | Eades et al. |
| 9,360,757 B2 | 6/2016 | Desimone et al. |
| 9,373,201 B2 | 6/2016 | Jefferies et al. |
| 9,453,142 B2 | 9/2016 | Rolland et al. |
| 9,498,920 B2 | 11/2016 | Desimone et al. |
| 9,562,429 B2 | 2/2017 | Walton et al. |
| 9,576,476 B2 | 2/2017 | Yang |
| 9,587,487 B2 | 3/2017 | Walton et al. |
| 9,589,428 B2 | 3/2017 | Edwards et al. |
| 9,595,058 B2 | 3/2017 | Khalid |
| 9,598,606 B2 | 3/2017 | Rolland et al. |
| 9,676,963 B2 | 6/2017 | Rolland et al. |
| 9,766,287 B2 | 9/2017 | Narasaki et al. |
| 9,795,528 B1 | 10/2017 | Delmestri et al. |
| 9,841,186 B2 | 12/2017 | Cho et al. |
| 10,259,171 B2 | 4/2019 | Robeson et al. |
| 10,434,706 B2 | 10/2019 | Robeson et al. |
| 2009/0130449 A1* | 5/2009 | El-Siblani ............ B29C 64/129 264/401 |
| 2013/0292862 A1 | 11/2013 | Joyce |
| 2013/0295212 A1 | 11/2013 | Chen et al. |
| 2014/0163717 A1 | 6/2014 | Das et al. |
| 2015/0097315 A1 | 4/2015 | Desimone et al. |
| 2015/0174658 A1 | 6/2015 | Ljungblad |
| 2016/0046075 A1 | 2/2016 | Desimone et al. |
| 2016/0116528 A1* | 4/2016 | Narasaki ............ G01R 31/2874 324/750.03 |
| 2016/0136889 A1 | 5/2016 | Rolland et al. |
| 2016/0193786 A1 | 7/2016 | Moore et al. |
| 2016/0200052 A1 | 7/2016 | Moore et al. |
| 2016/0288376 A1 | 10/2016 | Sun et al. |
| 2017/0056970 A1 | 3/2017 | Chin et al. |
| 2017/0129169 A1 | 5/2017 | Batchelder et al. |
| 2017/0260418 A1 | 9/2017 | Wu et al. |
| 2017/0297098 A1* | 10/2017 | Myerberg ............ B29C 64/264 |
| 2018/0065302 A1* | 3/2018 | Arai ...................... B29C 64/245 |
| 2018/0126630 A1 | 5/2018 | Panzer et al. |
| 2018/0134029 A1 | 5/2018 | Myerberg et al. |
| 2018/0229303 A1 | 8/2018 | Burlatsky et al. |
| 2018/0243976 A1 | 8/2018 | Feller |
| 2018/0290374 A1 | 10/2018 | Willis et al. |
| 2018/0304526 A1* | 10/2018 | Feller ..................... B33Y 40/20 |
| 2019/0079493 A1 | 3/2019 | Yang et al. |
| 2019/0095555 A1 | 3/2019 | Lopez et al. |
| 2019/0160733 A1 | 5/2019 | Mirkin et al. |
| 2019/0255765 A1 | 8/2019 | Takeyama et al. |

FOREIGN PATENT DOCUMENTS

| | | | |
|---|---|---|---|
| CN | 108602249 B * | 3/2021 | ........... B29C 64/124 |
| WO | 2015164234 A1 | 10/2015 | |
| WO | 2015195924 A1 | 12/2015 | |
| WO | 2016007495 A1 | 1/2016 | |
| WO | 2016123499 A1 | 8/2016 | |
| WO | 2016123506 A1 | 8/2016 | |
| WO | 2016133759 A1 | 8/2016 | |
| WO | 2016140886 A1 | 9/2016 | |
| WO | 2016145182 A1 | 9/2016 | |
| WO | 2016149014 A1 | 9/2016 | |
| WO | 2016149097 A1 | 9/2016 | |
| WO | 2016172788 A1 | 11/2016 | |
| WO | 2016172804 A1 | 11/2016 | |
| WO | 2016172805 A1 | 11/2016 | |
| WO | 2017210298 A1 | 12/2017 | |

OTHER PUBLICATIONS

International Search Report and Written Opinion corresponding to PCT/US2019/062762, Feb. 20, 2020, (13 pages).

International Search Report and Written Opinion corresponding to PCT/US2019/038211, Oct. 18, 2019, (14 Pages).

Bártolo, Paulo Jorge, "Stereolithography: Materials, Processes and Applications", Boston, MA: Springer US., 2011, 201-243.

Corcione, Esposito C., et al., "Temperature evolution during stereolithography building with a commercial epoxy resin", Polymer Engineering and Science, 46(4), 2006, 493-502.

Januszewicz, Rima, et al., "Layerless fabrication with continuous liquid interface production", PNAS, 113(42), 2016, 11703-11708.

Ligon, Samuel Clark, et al., "Polymers for 3D printing and customized additive manufacturing", Chemical Reviews. 117(15), 2017, 10212-10290.

Poelma, Justin, et al., "Rethinking digital manufacturing with polymers", Science, 358(6369), 2017, 1384-1385.

Sager, Benay, et al., "Simulation Methods for Stereolithography", In: Bártolo P. (eds) Stereolithography. Springer, Boston, MA., 2011, 183-241.

Tumbleston, John R., et al., "Continuous liquid interface production of 3D Objects", Science, 347(6228), 2015, 1349-1352.

\* cited by examiner

WINDOW THERMAL PROFILE CALIBRATION IN ADDITIVE MANUFACTURING

CROSS-REFERENCE TO RELATED APPLICATIONS

This application is a divisional of U.S. patent application Ser. No. 17/298,149, filed May 28, 2021, which is a 35 U.S.C. § 371 national phase application of International Application Serial No. PCT/US2019/062762, filed Nov. 22, 2019, which claims priority to U.S. Provisional Application Ser. No. 62/774,384, filed Dec. 3, 2018, with the entire contents of each above-identified application hereby incorporated by reference.

FIELD OF THE INVENTION

The present invention concerns additive manufacturing, particularly stereolithography, including continuous liquid interface production (CLIP).

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

With the increased speed and versatility of bottom-up stereolithography techniques, management of resin viscosity at low temperatures, alone or in combination with the subsequent management of excess heat generated during the exothermic polymerizations, has become important. These issues are even further complicated as window designs for such apparatus has evolved, with different window designs having different thermal profiles.

SUMMARY OF THE INVENTION

Various embodiments described herein provide a method of making an object on a bottom-up stereolithography apparatus. The apparatus may include a light source, a drive assembly, optionally a heater and/or cooler, and a controller operatively associated with said light source, said optional heater and/or cooler, and said drive assembly. The light source, optional heater and/or cooler, and/or the drive assembly may have at least one adjustable parameter that is adjustable by said controller. The method may include: (a) installing a removable window cassette on said apparatus in a configuration through which said light source projects, said window cassette including an optically transparent member having a build surface on which an object can be produced, and with said optically transparent member having at least one thermal profile associated therewith; and then (b) modifying said at least one adjustable parameter by said controller based on said at least one thermal profile of said optically transparent member; and then (c) producing the object on said build surface from a light-polymerizable liquid by bottom-up stereolithography.

In some embodiments, said window cassette includes a unique identifier (e.g., a bar code, QR code, NFC tag, etc.) operatively associated therewith, and said modifying step is carried out by: (i) detecting said unique identifier (e.g., with a unique identifier reader), and then (ii) transferring (e.g., over the Internet) correction instructions for said at least one thermal profile and corresponding to said unique identifier from a data storage media (e.g., a cloud database) to said controller.

In some embodiments, said window cassette includes a data storage media thereon (e.g., a flash drive), said data storage media containing said thermal profile; and said modifying step is carried out by: (i) operatively associating said data storage media with said controller (e.g., through a USB interface) and then (ii) transferring correction instructions for said at least one thermal profile from said data storage media to said controller.

In some embodiments, said optically transparent member comprises a plurality of distinct layers. In some embodiments, optically transparent member comprises: (i) a rigid or flexible, semi-permeable or impermeable, support member; (ii) either a semipermeable member (e.g., a fluoropolymer member) on said support member or an immiscible layer (e.g., a hydrogel) on said support member; (iii) an inhibitor of polymerization (e.g., oxygen) in said semipermeable member when present; (iv) optionally but preferably, a cushioning member between said impermeable support member and said semipermeable member; and (v) optionally but preferably, feed space (e.g., feed channels) between said impermeable support member and said semipermeable member (e.g., in or on said cushioning member), said feed space configured for supplying additional inhibitor of polymerization (e.g., oxygen) into said semipermeable member.

In some embodiments, said modifying step enhances at least one performance characteristic of said apparatus (e.g., by increasing a rate of production, by reducing a frequency of production failures thereon, by enhancing accuracy of object production thereon, by reducing defect formation in objects produced thereon, by resulting in more uniform polymerization, by increasing control over a green strength of the object, etc., including combinations thereof).

In some embodiments, said modifying said at least one adjustable parameter by said controller based on said at least one thermal profile of said optically transparent member comprises modifying a drive speed of said drive assembly and/or adjusting an intensity and/or exposure time of the light source.

In some embodiments, said heater and/or cooler is present, and said modifying said at least one adjustable parameter by said controller based on said at least one thermal profile of said optically transparent member comprises modifying an activation of said heater and/or cooler.

Various embodiments described herein provide a bottom-up stereolithography apparatus. The bottom-up stereolithography apparatus may include (a) a light source; (b) a drive assembly; (c) an engagement assembly operatively associated with said light source and configured for securing a removable window cassette on said apparatus in a configuration through which said light source projects, the window cassette comprising an optically transparent member having a build surface defining a build region in said apparatus on which an object can be produced and further comprising at least one thermoelectric device operatively associated therewith, and with said optically transparent member having at least one thermal profile associated therewith; (d) a controller operatively associated with said light source, said at least one thermoelectric device, and said drive assembly, with said light source, said at least one thermoelectric device and/or said drive assembly optionally having at least one adjustable parameter that is adjustable by said controller based on said at least one thermal profile associated with said optically transparent member; (e) either (i) a unique identifier reader (e.g., an NFC tag reader) operatively associated with said controller and configured for reading a unique identifier on said window cassette, or (ii) a data storage media coupling (e.g., a USB coupling) operatively associated with said controller and configured for coupling to a data storage media on said window cassette; (f) at least one temperature sensor operatively associated with said build region and configured to sense (directly or indirectly) a temperature of a polymerizable resin in said build region; and (g) a temperature controller operatively associated with said temperature sensor and said at least one thermoelectric device, said controller configured to activate said at least one thermoelectric device to maintain the temperature of a polymerizable resin in said build region above a predetermined minimum temperature (e.g., at least 30 or 35° C.) and/or below a predetermined maximum temperature (e.g., not more than 40, 50, 60, 80, or 100° C.).

In some embodiments, the controller of the bottom-up stereolithography apparatus comprises a proportional-integral-derivative (PID) controller, a proportional integral (PI) controller, or a dynamic matrix controller (DMC).

In some embodiments, the at least one thermoelectric device and the controller of the bottom-up stereolithography apparatus are configured for both heating and cooling said polymerizable resin.

In some embodiments, the temperature sensor comprises a contact or non-contact temperature sensor operatively associated with said window cassette.

In some embodiments, the at least one thermoelectric device of the bottom-up stereolithography apparatus comprises an infrared heater positioned below and directed at the optically transparent member.

Some embodiments provide a bottom-up stereolithography apparatus configured to perform any of the methods described herein.

Various embodiments of the present disclosure provide a window cassette useful for removably mounting on a bottom-up stereolithography apparatus. The window cassette may include: (a) a circumferential frame; (b) an optically transparent member connected to said circumferential frame, said optically transparent member having a build surface on which an object can be produced, and with said optically transparent member having at least one thermal profile associated therewith; (c) at least one thermoelectric device in said circumferential frame and in thermal contact with said optically transparent member; and (d) either a unique identifier (e.g., an NFC tag) or a data storage media (e.g., a flash memory) connected to said circumferential frame and configured to enable access to said at least one thermal profile associated with said optically transparent member.

In some embodiments, the window cassette comprises a plurality of thermoelectric devices.

In some embodiments, the at least one thermoelectric device of the window cassette comprises (i) at least one resistive heater, (ii) at least one Peltier device, or (iii) both at least one resistive heater and at least one Peltier device.

In some embodiments, the optically transparent member of the window cassette comprises a plurality of distinct layers.

In some embodiments, optically transparent member of the window cassette comprises: (i) a rigid or flexible, semi-permeable or impermeable, support member (e.g., glass, sapphire, or transparent aluminum (ALON)); (ii) either a semipermeable member on said support member (e.g., a fluoropolymer member) or an immiscible layer (e.g., a hydrogel) on said support member; (iii) an inhibitor of polymerization (e.g., oxygen) in said semipermeable member when present; (iv) optionally but preferably, a cushioning member between said impermeable support member and said semipermeable member; and (v) optionally but preferably, feed space (e.g., feed channels) between said impermeable support member and said semipermeable member (e.g., in or on said cushioning member), said feed space configured for supplying additional inhibitor of polymerization (e.g., oxygen) into said semipermeable member.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

"Unique identifier" and "unique identifier reader" as used herein refer to components of an automatic identification and data capture system. Suitable unique identifiers include, but are not limited to, bar codes (including one-dimensional and two-dimensional bar codes (QR codes)), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Such unique identifiers can be mounted on a container for resins for distribution from a resin provider to an end user, as discussed further below.

"Information storage media" as used herein may be any of the same devices described above in connection with "unique identifier," except used to store resin characteristics or modified operating instructions, as opposed to a resin unique identity, as discussed below.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, U.S. Patent Application Publication No. 2013/0295212 to Chen et al, and U.S. Patent Application Publication No. 2018/0290374 to Willis et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The inhibitor may pass entirely through the semipermeable member, or a "pool" of inhibitor may reside within the semipermeable member and pass through the resin contact surface thereof, as described in DeSimone et al. (referenced above), and also in Sun et al., U.S. Patent Application Publication No. 2016/0288376. While a preferred inhibitor is oxygen, other inhibitors, such as bases (including amines) as described in DeSimone et al., or those described in Sun et al., may also be used. Other approaches for carrying out CLIP that can be used in the present invention and potentially obviate the need for a semipermeable "window" or window structure include utilizing a liquid interface comprising an immiscible liquid (see L. Robeson et al., International Publication No. WO2015/164234, published Oct. 29, 2015; U.S. Pat. No. 10,259,171 and 10,434,706; see also C. Mirkin et al., International Publication No. WO 2017/210298 and U.S. Patent Application Publication No. 2019/0160733), generating oxygen as an inhibitor by electrolysis (see I Craven et al., International Publication No. WO2016/133759, published Aug. 25, 2016), and incorporating magnetically positionable particles to which the photoactivator is coupled into the polymerizable liquid (see J. Rolland, International Publication No. WO2016/145182, published Sep. 15, 2016), and approaches described in U.S. Patent Application Publication No. 2018/0126630 to Panzer et al., and U.S. Patent Application Publication No. 2018/0243976 to Feller.

The apparatus can include a local controller that contains and executes operating instructions for the production of a three dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., Three-dimensional printing with reciprocal feeding of polymerizable liquid PCT Patent Application Pub. No. WO2015/195924 (published 23 Dec. 2015); Sutter et al., Fabrication of three dimensional objects with multiple operating modes, PCT Patent Application Publication No. WO2016/140886 (published 9 Sep. 2016); J. DeSimone et al., Methods and apparatus for continuous liquid interface production with rotation, PCT Patent Application WO2016/007495 (published 14 Jan. 2016); see also J. DeSimone et al., U.S. Pat. No. 9,211,678, and J. Batchelder et al., Continuous liquid interface production system with viscosity pump, U.S. Patent Application Publication No. U.S. 2017/0129169 (published 11 May 2017). In one non-limiting embodiment, the apparatus may be a Carbon Inc., M1 or M2 additive manufacturing apparatus, available from Carbon, Inc., 1089 Mills Way, Redwood City, CA 94063 USA.

2. Build Plates and Window Cassettes.

While the present invention is in a preferred embodiment envisioned for window cassettes used to carry out CLIP, it is applicable to any bottom-up stereolithography process for which a window may benefit from optical correction, whether that window is formed from a single layer of optically transparent material, or from multiple layers of optically transparent materials formed of different materials.

In some embodiments, a window cassette useful for removably mounting on a bottom-up stereolithography apparatus includes: (a) a circumferential frame; (b) an optically transparent member connected to the circumferential frame, the optically transparent member having a build surface on which an object can be produced, and with the optically transparent member having and at least one variable property therein; and (c) either a unique identifier (e.g., an NFC tag) or a data storage media (e.g., a flash memory)

connected to the circumferential frame. The optically transparent member may include a plurality of distinct layers. In some embodiments, the optically transparent member comprises: (i) a rigid or flexible, semi-permeable or impermeable, support member; (ii) either a semipermeable member on the support member (e.g., a fluoropolymer member) or an immiscible layer (e.g., a hydrogel) on the support member; (iii) an inhibitor of polymerization (e.g., oxygen) in the semipermeable member when present; (iii) optionally but preferably, a cushioning member between the impermeable support member and the semipermeable member; and (v) optionally but preferably, feed space (e.g., feed channels) between the impermeable support member and the semipermeable member (e.g., in or on the cushioning member), the feed space configured for supplying additional inhibitor of polymerization (e.g., oxygen) into the semipermeable member.

Examples of windows that can be used to carry out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. 2016/0046075 to J. DeSimone, A. Ermoshkin et al.; US 2016/0193786 to D. Moore, A. Ermoshkin et al.; 2016/0200052 to D. Moore, J. Tumbleston et al.; and 2016/0288376 to Sun and Lichkus; PCT Patent Application Publication Nos. WO2016/123499 to D. Moore, J. Tumbleston et al; WO2016/123506 to D. Moore, J. Tumbleston et al.; WO2016/149097 to J. Tumbleston, E. Samulski et al.; WO2016/149014 to J. Tumbleston, E. Samulski et al.; WO2016/172783 to R. Fortier and D. Castanon; WO2016/172788 to R. Fortier and D. Castanon; WO2016/172804 to R. Fortier and D. Castanon; WO2016/172805 to R. Fortier and D. Castanon; and WO2015/164234 to L. Robeson, E. Samulski et al.; and others (the disclosures of all of which are incorporated by reference herein in their entirety).

3. Example Apparatus and Methods

Figure 1:
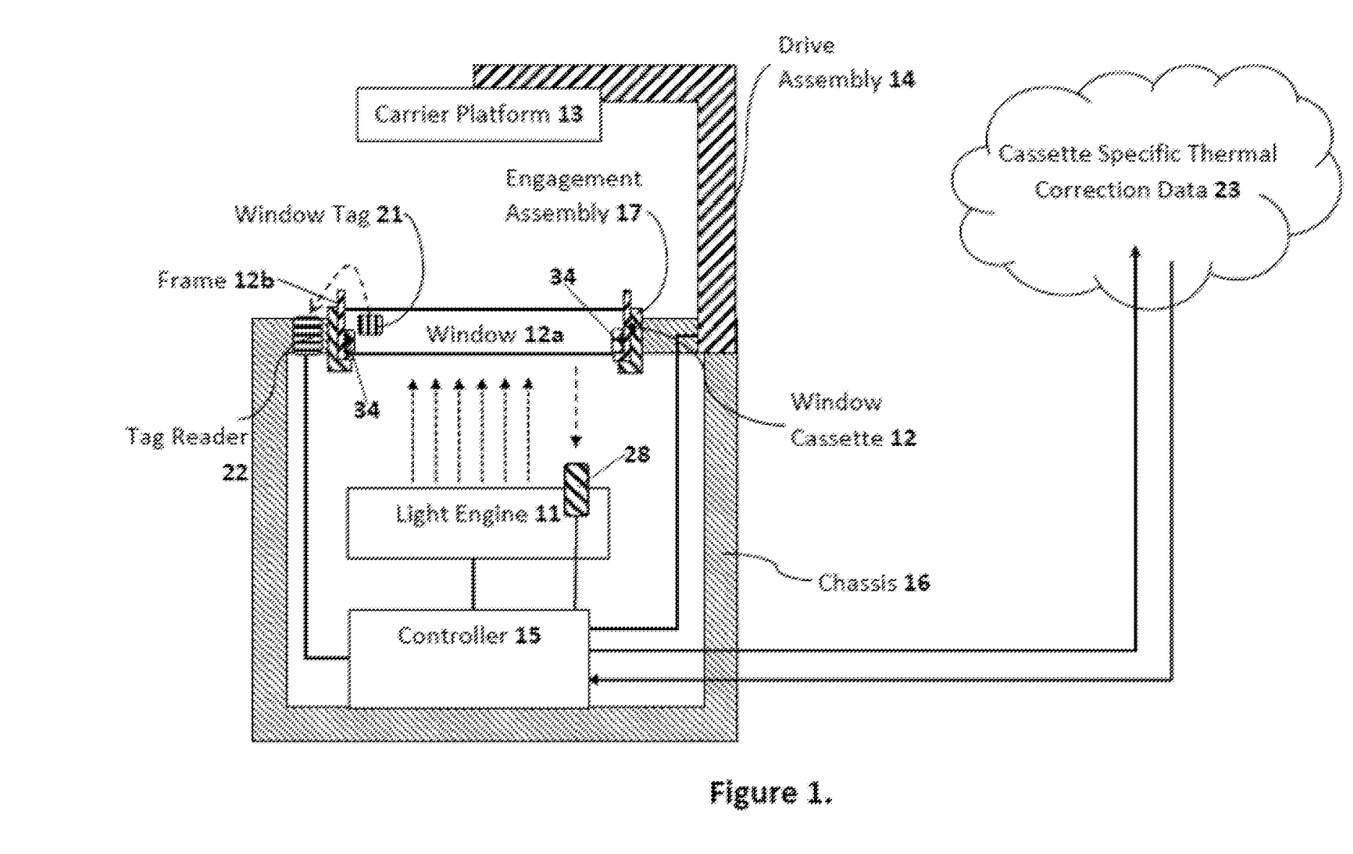
FIG. 1 schematically illustrates a first embodiment of the present invention, in which optical correction instructions are transferred from a cloud database to a controller over the Internet.
Figure 2:
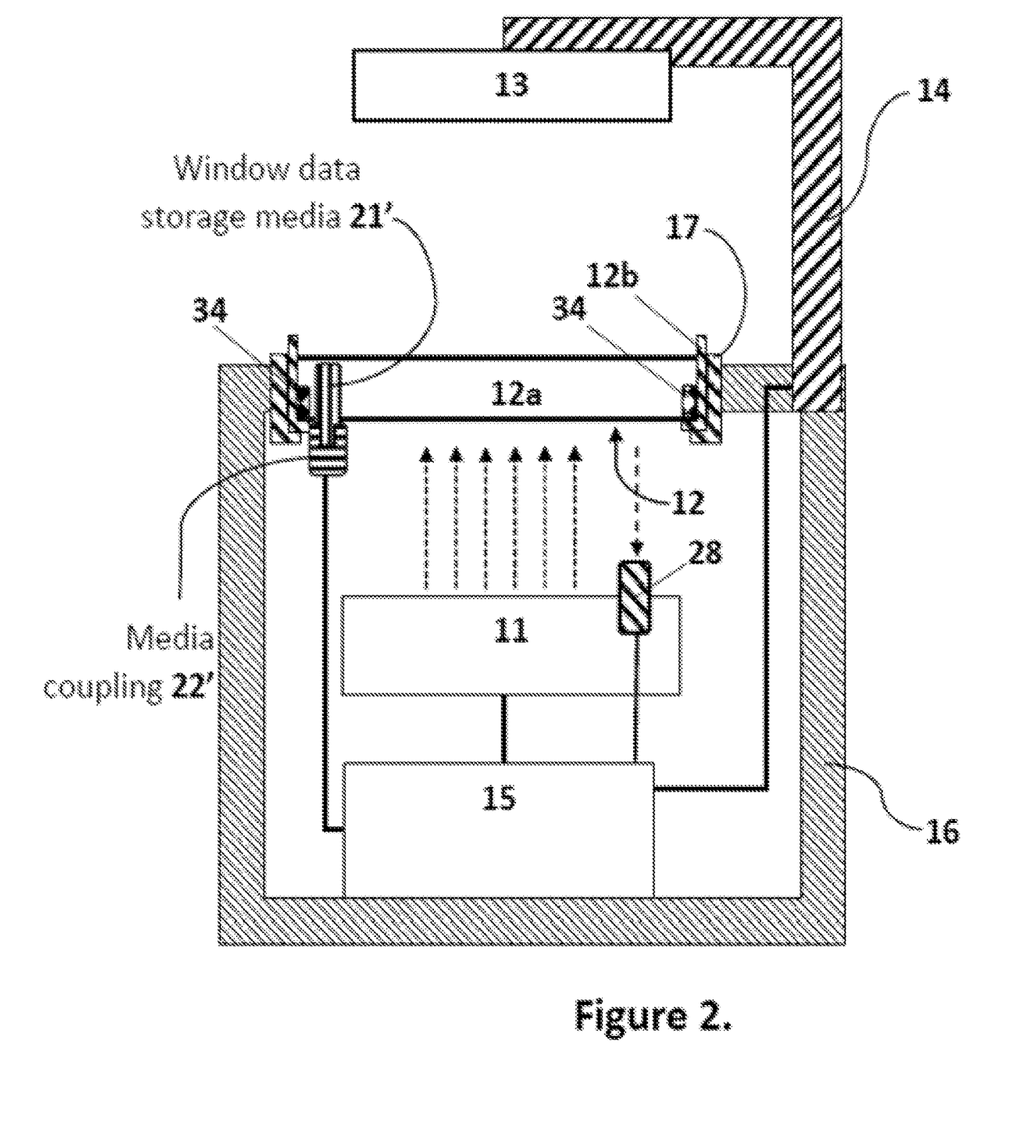
FIG. 2 schematically illustrates a second embodiment of the present invention, in which optical correction instructions are transferred from a storage media associated with the window cassette to a controller via a local connection.

Examples of apparatus useful for carrying out the present invention are given in FIGS. 1-2. In each case, the apparatus includes a light engine 11 operatively associated with a removable window cassette 12, along with a (typically also removable) carrier platform 13 on a drive assembly 14. All are operatively associated with a chassis 16. A controller 15 (which may be included "on-board" the chassis, or separately) is operatively associated with the drive assembly and light engine. The window cassette is typically mounted to the apparatus frame by means of an engagement or alignment assembly 17.

The window cassette 12 typically includes an optically transparent window 12a (which may be comprised of multiple layers as described above) and a window frame 12b. The apparatus engagement assembly 17 is configured to releasably secure the window frame 12b in an aligned configuration with the light engine 11.

In the embodiment of FIG. 1, the controller is operatively associated with a window unique identifier (or "tag") reader 22, which is positioned on the apparatus in a configuration to read from a window unique identifier or "tag" 21 that is connected to the window cassette 12. The reader is operatively associated with the controller 15, which is in turn configured to transmit that unique identifier to a database (such as a cloud database 23) via the Internet and receive cassette-specific thermal correction instructions from that database, so that appropriate correction can be made locally, as discussed below.

In the embodiment of FIG. 2, the window cassette further comprises a window data storage media 21', and the apparatus includes a media coupling 22'. The storage media includes cassette-specific optical correction instructions. When secured to the apparatus, the storage media couples to the coupling 22', which in turn is operatively associated with controller 15, and which is in turn configured to download and receive cassette-specific optical correction instructions so that appropriate correction can be made locally, as discussed below.

While non-limiting examples of system architectures are given in FIGS. 1-2, it will be appreciated that any of a variety of different architectures can be employed. Controllers can be a general purpose computer dedicated to, or on board, a particular apparatus; a local general purpose computer operatively associated with a group of machines via a local area network (or metropolitan area network); a remote general purpose computer operatively associated with machines via a wide area network or internet connection; and combinations thereof (for example, organized in a client-server architecture and/or distributed architecture). Likewise, data storage or memory can be on separate (volatile and/or non-volatile) memory devices located locally or remotely, partitioned sections of a single memory device, etc., including combinations thereof (e.g., a remote back-up memory in addition to a local memory). Peripheral devices for data entry and display can be implemented in any of a variety of ways known in the art, including typical keypad entry, video display, and printing apparatus, as well as graphical user interfaces such as touch-pads, touch-screens and the like, including smart-phone touch screens.

At least one thermoelectric device 34 may be present, which may be provided to heat and/or cool the optically transparent window 12a. Although FIG. 1 shows the at least one thermoelectric device 34 as a component of the removable window cassette 12 (e.g., a component within frame 12b, the present disclosure is not limited thereto, and the at least one thermoelectric devices 34 may be located elsewhere in the apparatus (e.g., above or below the removable window cassette 12. The at least one thermoelectric device (34) preferably comprises a plurality (e.g., 2, 3, 4 or more) thermoelectric devices, which may be of the same type, or may be different from one another. Any suitable thermoelectric device can be used to carry out the present invention, including resistive heaters (e.g., metal, polymer, and composite resistive heaters), infrared heaters (for example, positioned below and directed at the optically transparent member), ultrasonic or piezoelectric heaters, thermoelectric devices relying on the thermoelectric or Peltier effect (e.g., "Peltier devices" for heating and/or cooling), etc., including combinations thereof. Examples include but are not limited to those set forth in U.S. Pat. No. 6,300,150 and U.S. Patent Publication Nos. 2007/0028956 and 2006/0086118. Heat sinks, particularly when cooling is carried out, may optionally be thermally coupled to the thermoelectric device (e.g., by direct contact or through a thermally conductive coupling), as discussed further below. In some embodiments, Peltier devices are preferred, as they can be used to both heat and cool resin by reversing polarity (though Peltier coolers can be used in combination with dedicated heaters, such as resistive heaters, as well).

In some embodiments, the controller may be configured to heat the resin with the thermoelectric device(s), for example when the temperature of the resin is below a predetermined minimum (e.g., at the beginning, or early stages, of production of a particular object or group of objects). In some embodiments, the controller may be configured, or also configured, to cool the resin, for example when the temperature of the resin approaches a predetermined maximum. Such cooling as temperature of the resin increases during production (due to the exothermic nature of the polymerization) may be advantageous where the other option to avoiding excessively high temperatures is to slow down the speed of production.

The predetermined minimum temperature may, for example, be at least 30 or 35° C. In some embodiments, the method may further comprise an operation of warming the resin to an actual temperature greater than the predetermined minimum temperature prior to the initial production steps. And in some embodiments, the activating of the at least one heating thermoelectric device 34 can be discontinued (or in the case of a Peltier device, function changed and cooling initiated initiated) prior to the resin actual temperature exceeding a predetermined maximum temperature (e.g., not more than 40, 50, 60, 80, or 100° C.).

As noted above, one or more temperature sensors 28 may be operatively associated with the build region, and may be configured to sense, directly or indirectly, the temperature of a polymerizable resin in the build region. Any suitable temperature sensor(s) can be used, including contact or non-contact temperature sensors such as infrared sensors, pyrometers, microbolometers, thermal cameras, thermistors, etc.). For example, an IR sensor can be positioned beneath the window, and directed to the bottom of the window. Such an IR sensor (or sensors, if a plurality are employed) can be tuned to a wavelength such that it primarily senses the temperature of the window itself as a surrogate for the temperature of the resin (with the controller 15 adjusted or configured accordingly), or can be a sensor which is tuned to a wavelength that looks through the window and more directly sense the temperature of the resin.

The controller 15 may comprise at least one temperature controller that is operatively associated with the one or more temperature sensors 28 and the at least one thermoelectric device 34. The controller 15 may be configured to intermittently activate the at least one thermoelectric device 34, for example responsive to data received from the one or more temperature sensors 28. Suitable controllers include proportional-integral-derivative (PID) controllers, proportional integral (PI) controllers, dynamic matrix controllers (DMCs), etc. (See, e.g., U.S. Pat. Nos. 9,841,186 9,795,528; 9,766,287; 9,220,362, the disclosures of which are incorporated herein by reference in their entirety). The controller 15 may perform pulse-width modulation to control each the infrared heat source. The controller 15 may be configured to maintain the resin within a predetermined temperature range of from 30 or 35° C. to 60, 80, or 100° C., or more. In addition, where a plurality of thermoelectric devices 34 are used, each focused on separate (optionally partially overlapping) regions of the window, the thermoelectric devices 34 may be independently controlled by the controller(s) 15. This independent control may provide different regions of the window with different heat input (e.g., from heat of polymerization) or heat drain (e.g., from contact with an adjacent supporting structure, contact to a carrier plate, etc.). For such separate control of the heat sources, multiple, separately focused or directed, temperature sensors 28 may be used, or one or more infrared camera (providing a thermal map) can be used to provide independent data for independent control of the multiple thermoelectric devices.

The thermoelectric devices (34) are preferably electrically connected to the controller (15) by a connector, such as a latching connector or a break-away electrical connector. Such break-away connectors typically comprised two mating members, one of which is connected to the frame, and the other of which is connected to a flexible line which is in turn connected to controller. Such connectors are known and described in, for example, U.S. Pat. Nos. 2,933,711; 3,363, 214; 7,517,222; and 7,874,844, the disclosures of which are incorporated herein by reference in their entirety.

Similar corrections can be made when the window is one that is semipermeable to an inhibitor of polymerization (e.g., oxygen), and the variable property is permeability, particularly reduced permeability, to that inhibitor. For example, when permeability (in a discrete region of the window, in a gradient across the window or in the entirety of the window) is less than expected (e.g., as compared to prior windows, an average of prior windows, or an actual or arbitrary standard window), then light intensity projected from the light engine can be reduced, speed of production (as carried out by the drive assembly) can be reduced, or a combination thereof. If permeability in some regions is too low to feasibly produce objects therein, then an exclusion region can be created.

4. Cassette-Specific Thermal Correction

Different removable window cassettes 12 may comprise materials having various thermal properties. For example, the widow cassette may comprise either a semipermeable member (e.g., a fluoropolymer member) or an immiscible layer (e.g., a hydrogel); an inhibitor of polymerization (e.g., oxygen) in said semipermeable member when present; an optional cushioning member; and/or optional feed space (e.g., feed channels) configured for supplying additional inhibitor of polymerization (e.g., oxygen). The presence, dimensions, and/or materials used in the construction of a removable window cassette 12 may each contribute to a thermal profile of the removable window cassette 12. The thermal profile of the removable window cassette 12 may comprise and/or be associated with one or more thermal profile characteristics. Some thermal profile characteristics may be independent, or may be dependent (e.g., based on one or more other thermal profile characteristics). Some examples of thermal profile characteristics include thermal diffusivity, thermal capacitance, window geometry and/or shape, temperature at a location where polymerization occurs, transient heating rates of the thermoelectric devices, room temperature, and so on. Values for each characteristic of a thermal profile characteristics may be determined empirically, or based on one or more modeled parameters.

A removable window cassette may be associated with one or more thermal profiles. For example, the thermal properties of a removable window cassette may differ whether one or more thermoelectric devices 34 are present and operating and/or are not present or not operating. Data and/or attributes associated with each removable window cassette 12, and/or with each thermal profile of the removable window cassette 12 may be stored in the cloud database 23 and retrieved therefrom.

Figure 3:
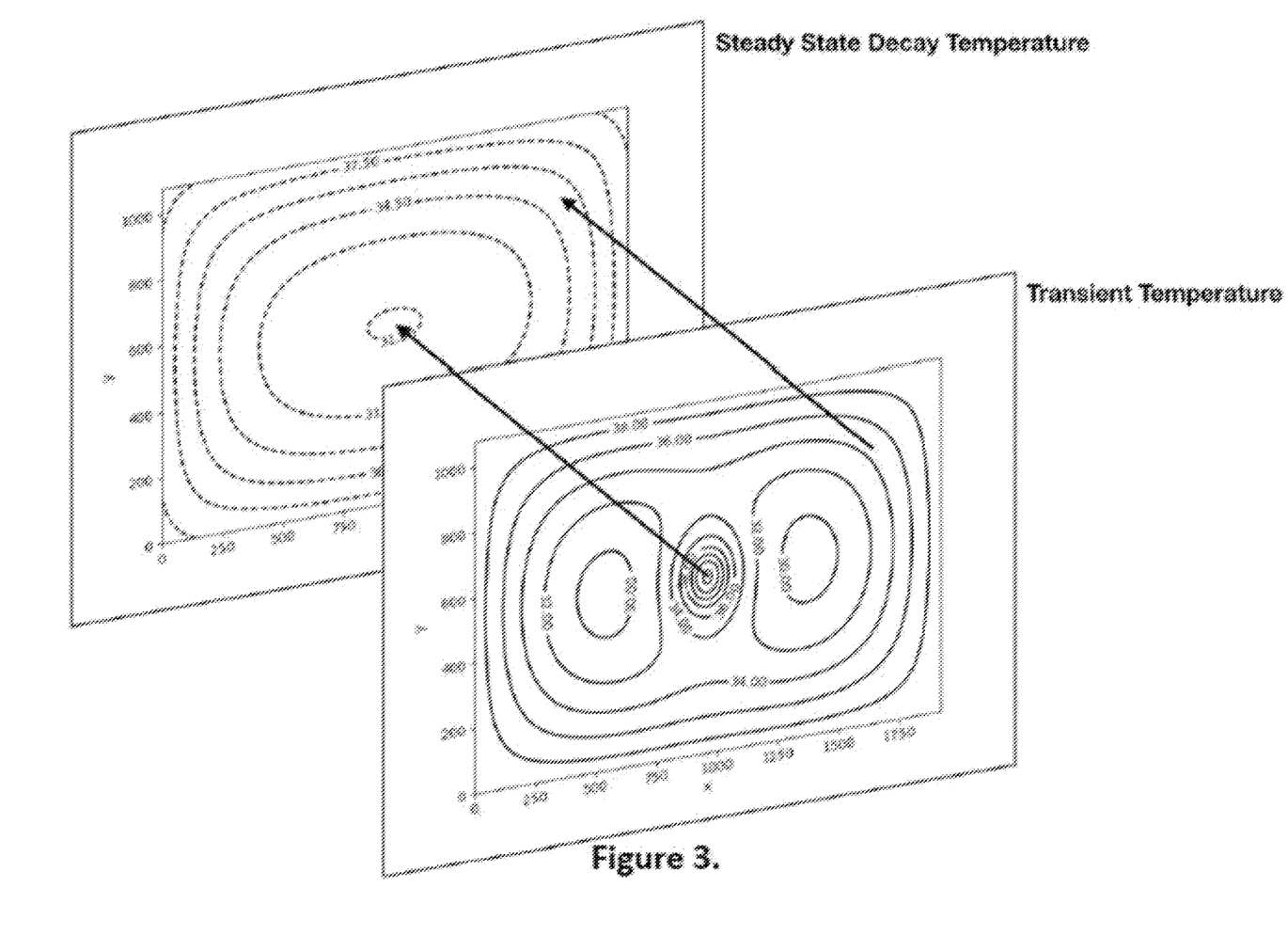
FIG. 3 illustrates example aspects of thermal properties of removable window cassettes, used in the production of objects via bottom-up stereolithography.

Photo-polymerization of resin may be an exothermic reaction, and as such, heat may be added to the window. This additional heat may be considered uncontrolled, in that it is not the result of control and/or operation of the one or more thermoelectric devices 34. As seen in FIG. 3, a first thermal profile of the window may be a steady state profile of the window without resin polymerization, with controlled heat from an external source (e.g., the one or more thermoelectric devices 34). The isotherms in the illustration of the steady state thermal profile illustrate that the window is at a higher temperature at the edges of the window than in the center of the window. However, during production of an object, transient heat may be added to the steady state profile as the result of photo-polymerization of the resin. The production of the object can be adjusted either based on the measured transient thermal profile, or by separating the steady state thermal profile from the transient thermal profile and treating the two separately.

Figure 4:
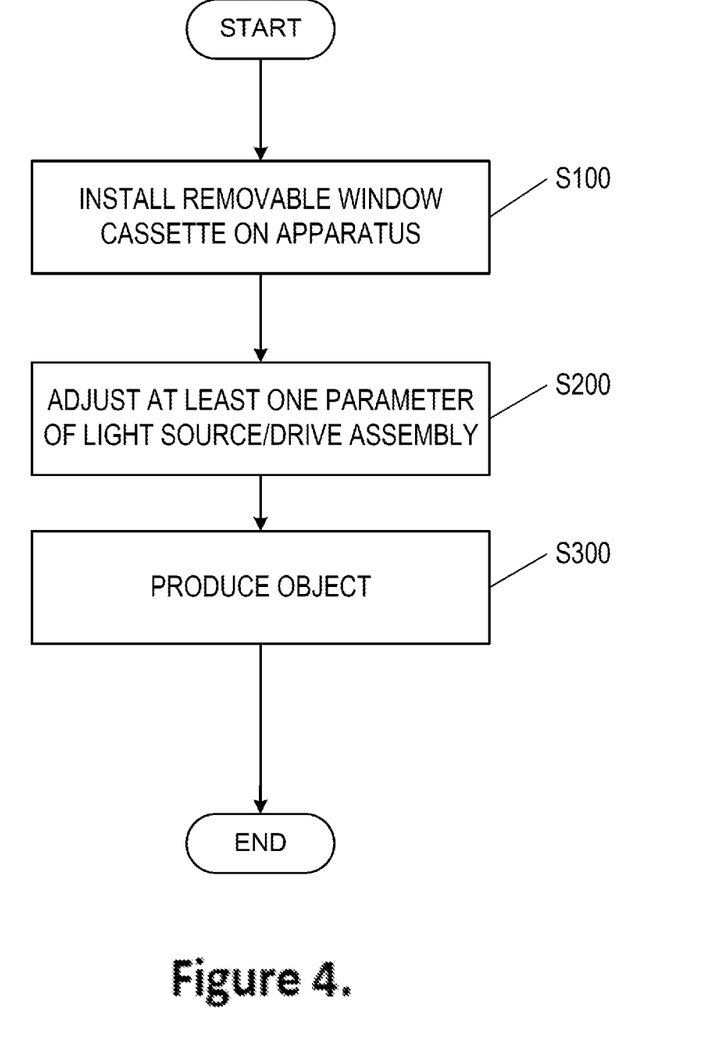
FIG. 4 illustrates a flowchart that may be used in accordance with the present disclosure to produce an object on a bottom-up stereolithography apparatus with a window having a characteristic thermal profile.

FIG. 4 illustrates a flowchart that may be used in accordance with the present disclosure to produce an object on a bottom-up stereolithography apparatus with a window having a characteristic thermal profile. For example, the flowchart of FIG. 4 may be used in a method of making an object on a bottom-up stereolithography apparatus that includes a light source, drive assembly, and a controller operatively associated with the light source and drive assembly. One or more of the light source, at least one thermoelectric device, and drive assembly may have an adjustable parameter (e.g., drive speed) and a light polymerizable resin on a light-transmissive window by projection of light through the window in a bottom-up stereolithography process, In a first operation, S100, a removable window cassette may be installed on the apparatus in a configuration such that the light source projects through the window of the removable window cassette. For example, the window cassette may include an optically transparent member, which may have a build surface on which the object can be produced. The optically transparent member may have at least one thermal profile associated therewith. In operation S200, the at least one adjustable parameter of the light source, at least one thermoelectric device, and/or drive assembly may be modified by said controller based on said at least one thermal profile of said window. For example, the window or window cassette may be associated with a unique identifier (e.g., a bar code, QR code, NFC tag, etc.). The unique identifier may be scanned by or otherwise detected by the controller 15. Correction instructions based on the thermal profile that correspond to the unique identifier may be transferred (e.g., over a network, such as the Internet) from a data storage media (e.g., a cloud database) to the controller 15. In some embodiments, the thermal profile that corresponds to the unique identifier may be transferred (e.g., over a network, such as the Internet) from a data storage media (e.g., a cloud database) to the controller 15, and correction instructions may be generated by the controller 15 based on the received thermal profile. In operation S300, the object may be produced on said build surface from a light-polymerizable liquid by bottom-up stereolithography. The foregoing is illustrative of the present invention, and is not to be construed as limiting thereof. The invention is defined by the following claims, with equivalents of the claims to be included therein.

We claim:

1. A bottom-up stereolithography apparatus, comprising:
   (a) a light source;
   (b) a drive assembly;
   (c) an engagement assembly operatively associated with said light source and configured for securing a removable window cassette on said apparatus in a configuration through which said light source projects, the removable window cassette comprising an optically transparent member having a build surface defining a build region in said apparatus on which an object can be produced and further comprising at least one thermoelectric device operatively associated therewith, and with said optically transparent member having at least one thermal profile associated therewith, wherein a dimension and/or a material in said optically transparent member contributes to said at least one thermal profile, and wherein said removable window cassette comprises a unique identifier or a data storage media that is configured to enable access to said at least one thermal profile and/or thermal correction instructions based on said at least one thermal profile;
   (d) a main controller operatively associated with said light source, said at least one thermoelectric device, and said drive assembly, wherein said main controller is configured to adjust at least one adjustable parameter of said light source, said at least one thermoelectric device and/or said drive assembly based on said at least one thermal profile and/or said thermal correction instructions based on said at least one thermal profile;
   (e) either (i) a unique identifier reader operatively associated with said main controller and configured for reading said unique identifier on said removable window cassette, wherein said main controller is configured to transmit said unique identifier to a database and to receive said thermal correction instructions based on said at least one thermal profile; or (ii) a data storage media coupling operatively associated with said main controller and configured for coupling to a data storage media on said removable window cassette, wherein said main controller receives said thermal correction instructions based on said at least one thermal profile from said data storage media;
   (f) at least one temperature sensor operatively associated with said build region and configured to sense a temperature of a polymerizable resin in said build region; and
   (g) a temperature controller operatively associated with said at least one temperature sensor and said at least one thermoelectric device, said temperature controller configured to activate said at least one thermoelectric device to maintain the temperature of said polymerizable resin in said build region above a predetermined minimum temperature and/or below a predetermined maximum temperature defined by said at least one thermal profile.

2. The bottom-up stereolithography apparatus of claim 1, wherein said main controller comprises a proportional-integral-derivative (PID) controller, a proportional integral (PI) controller, or a dynamic matrix controller (DMC).

3. The bottom-up stereolithography apparatus of claim 1, wherein said at least one thermoelectric device and said temperature controller are configured for both heating and cooling of said polymerizable resin in different modes of operation.

4. The bottom-up stereolithography apparatus of claim 1, wherein said at least one temperature sensor comprises a contact or non-contact temperature sensor operatively associated with said removable window cassette.

5. The bottom-up stereolithography apparatus of claim 1, wherein said at least one thermoelectric device comprises an infrared heater positioned below and directed at the optically transparent member.

6. The bottom-up stereolithography apparatus of claim 1, wherein said at least one adjustable parameter comprises a drive speed of said drive assembly, an intensity of said light source, and/or an exposure time of said light source.

7. A bottom-up stereolithography apparatus, comprising:
   (a) a light source;
   (b) a drive assembly;
   (c) an engagement assembly operatively associated with said light source and configured for securing a removable window cassette on said apparatus in a configuration through which said light source projects, the removable window cassette comprising an optically transparent member having a build surface defining a build region in said apparatus on which an object can be produced and further comprising at least one thermoelectric device operatively associated therewith, and with said optically transparent member having at least one thermal profile associated therewith, wherein a dimension and/or a material in said optically transparent member contributes to said at least one thermal profile, and wherein said removable window cassette comprises a unique identifier or a data storage media that is configured to enable access to said at least one thermal profile and/or thermal correction instructions based on said at least one thermal profile;

(d) at least one temperature sensor operatively associated with said build region and configured to sense a temperature of a polymerizable resin in said build region;

(e) a control system operatively associated with said light source, said at least one thermoelectric device, and said drive assembly, said control system configured to adjust at least one adjustable parameter of said light source, said at least one thermoelectric device and/or said drive assembly based on said at least one thermal profile associated with said optically transparent member, said controller control system configured to maintain the temperature of said polymerizable resin in said build region above a predetermined minimum temperature identified by said at least one thermal profile and below a predetermined maximum temperature identified by said at least one thermal profile; and (f) a data storage media coupling operatively associated with said control system and configured for coupling to a data storage media on said removable window cassette, wherein said control system receives said thermal correction instructions based on said at least one thermal profile from said data storage media.

8. The bottom-up stereolithography apparatus of claim 7, wherein said control system comprises a proportional-integral-derivative (PID) controller, a proportional integral (PI) controller, or a dynamic matrix controller (DMC).

9. The bottom-up stereolithography apparatus of claim 7, wherein said at least one thermoelectric device and said control system are configured for both heating and cooling of said polymerizable resin in different modes of operation.

10. The bottom-up stereolithography apparatus of claim 7, wherein said temperature sensor comprises a contact or non-contact temperature sensor operatively associated with said removable window cassette.

11. The bottom-up stereolithography apparatus of claim 7, wherein said at least one thermoelectric device comprises an infrared heater positioned below and directed at the optically transparent member.

12. A bottom-up stereolithography apparatus, comprising:
(a) a light source;
(b) a drive assembly;
(c) an engagement assembly operatively associated with said light source and configured for securing a removable window cassette on said apparatus in a configuration through which said light source projects, the removable window cassette comprising an optically transparent member having a build surface defining a build region in said apparatus on which an object can be produced and further comprising at least one thermoelectric device operatively associated therewith, and with said optically transparent member having at least one thermal profile associated therewith, wherein a dimension and/or a material in said optical transparent member contributes to said at least one thermal profile, and wherein said removable window cassette comprises a unique identifier that is configured to enable access to said at least one thermal profile and/or thermal correction instructions based on said at least one thermal profile;

(d) a main controller operatively associated with said light source, said at least one thermoelectric device, and said drive assembly, wherein said main controller is configured to adjust at least one adjustable parameter of said light source, said at least one thermoelectric device and/or said drive assembly based on said at least one thermal profile and/or said thermal correction instructions based on said at least one thermal profile;

(e) a unique identifier reader operatively associated with said main controller and configured for reading a unique identifier on said removable window cassette, wherein said main controller is configured to transmit said unique identifier to a database and to receive said thermal correction instructions based on said at least one thermal profile;

(f) at least one temperature sensor operatively associated with said build region and configured to sense a temperature of a polymerizable resin in said build region; and (g) a temperature controller operatively associated with said at least one temperature sensor and said at least one thermoelectric device, said temperature controller configured to activate said at least one thermoelectric device to maintain the temperature of said polymerizable resin in said build region above a predetermined minimum temperature and/or below a predetermined maximum temperature, said predetermined minimum and maximum temperatures defined by said at least one thermal profile.

13. The bottom-up stereolithography apparatus of claim 12, wherein said main controller comprises a proportional-integral-derivative (PID) controller, a proportional integral (PI) controller, or a dynamic matrix controller (DMC).

14. The bottom-up stereolithography apparatus of claim 12, wherein said at least one thermoelectric device and said temperature controller are configured for both heating and cooling of said polymerizable resin in different modes of operation.

15. The bottom-up stereolithography apparatus of claim 12, wherein said temperature sensor comprises a contact or non-contact temperature sensor operatively associated with said removable window cassette.

16. The bottom-up stereolithography apparatus of claim 12, wherein said at least one thermoelectric device comprises an infrared heater positioned below and directed at the optically transparent member.

* * * * *

UNITED STATES PATENT AND TRADEMARK OFFICE
CERTIFICATE OF CORRECTION

PATENT NO. : 12,128,619 B2
APPLICATION NO. : 17/967969
DATED : October 29, 2024
INVENTOR(S) : Mohsenizadeh et al.

Page 1 of 1

It is certified that error appears in the above-identified patent and that said Letters Patent is hereby corrected as shown below:

In the Claims

Column 13, Line 27, Claim 7: Please correct "said controller control" to read --said control--

Signed and Sealed this
Eleventh Day of February, 2025

Coke Morgan Stewart
*Acting Director of the United States Patent and Trademark Office*